(12) United States Patent
Shevela (10) Patent No.: US 7,346,994 B2
(45) Date of Patent: Mar. 25, 2008

(54) ADAPTIVE CRUISE CONTROL SENSOR ALIGNMENT TOOL AND METHOD

(75) Inventor: Michael Shevela, Harrison Township, MI (US)

(73) Assignee: SPX Corporation, Charlotte, NC (US)

( * ) Notice: Subject to any disclaimer, the term of this patent is extended or adjusted under 35 U.S.C. 154(b) by 671 days.

(21) Appl. No.: 10/811,941

(22) Filed: Mar. 30, 2004

(65) Prior Publication Data

US 2005/0222746 A1 Oct. 6, 2005

(51) Int. Cl.
*G01B 5/24* (2006.01)
*G01B 11/26* (2006.01)

(52) U.S. Cl. .......................... 33/288; 33/600
(58) Field of Classification Search ............ 33/286, 33/288, 600, 203.18, 203.19, 203.2; 356/139.09, 356/144, 155, 399, 6; 340/903, 904; 342/70, 342/71, 174; 701/96
See application file for complete search history.

(56) References Cited

U.S. PATENT DOCUMENTS

| | | | | |
|---|---|---|---|---|
| 3,337,961 A | * | 8/1967 | Holub | 33/288 |
| 3,445,936 A | * | 5/1969 | Wilkerson | 33/288 |
| 3,685,161 A | * | 8/1972 | MacPherson | 33/288 |
| 4,106,208 A | * | 8/1978 | Hunter | 33/288 |
| 4,573,275 A | * | 3/1986 | Bremer | 33/288 |
| 4,803,785 A | * | 2/1989 | Reilly | 33/288 |
| 5,446,967 A | * | 9/1995 | Gender | 33/203.18 |
| 5,648,846 A | * | 7/1997 | Douine et al. | 356/139.09 |
| 5,781,286 A | * | 7/1998 | Knestel | 356/139.09 |
| 5,886,782 A | * | 3/1999 | Hedgecock, Jr. | 356/155 |
| 5,987,761 A | * | 11/1999 | Ohnesorge | 33/203.18 |
| 6,018,879 A | * | 2/2000 | Carder | 33/203.18 |
| 6,583,868 B2 | * | 6/2003 | Hopfenmuller | 356/139.09 |
| 6,823,601 B2 | * | 11/2004 | Murray | 33/288 |
| 6,828,931 B2 | * | 12/2004 | Kikuchi et al. | 342/174 |
| 6,842,152 B2 | * | 1/2005 | Kikuchi | 343/713 |
| 7,121,011 B2 | * | 10/2006 | Murray et al. | 33/288 |
| 2006/0185180 A1 | * | 8/2006 | MacKelvie | 33/203.18 |

* cited by examiner

*Primary Examiner*—Alexander R. Smith
(74) *Attorney, Agent, or Firm*—Baker & Hostetler LLP

(57) ABSTRACT

An alignment tool for vehicular adaptive cruise control detection devices attaches with precision and repeatability to an adaptive cruise control sensor subassembly. Integral to this alignment tool is a low energy visible light laser that can be adjusted to point along the signal axis of the ACC sensor subassembly with stable and calibratable precision. The point at which a visible laser light beam strikes a reference surface can reveal the alignment of the ACC sensor subassembly with respect to the vehicle.

26 Claims, 8 Drawing Sheets

ADAPTIVE CRUISE CONTROL SENSOR ALIGNMENT TOOL AND METHOD

FIELD OF THE INVENTION

The present invention relates generally to automobile maintenance and repair calibration tools. More particularly, the present invention relates to a method and apparatus that aids in mechanically aligning and verifying the alignment of adaptive cruise control sensors.

BACKGROUND OF THE INVENTION

Adaptive Cruise Control (ACC) is an evolution of cruise control devices that, in addition to measuring and regulating the forward speed of the vehicle on which the cruise control is mounted (own-car), can also measure the distance to and/or the relative speed of a vehicle ahead of the own-car. The ACC apparatus can permit normal cruise control operation within a range of acceptable conditions. When either the distance or the closing rate with respect to the vehicle ahead becomes unsatisfactory, the ACC can attempt to reduce own-car speed until an acceptable condition range is reestablished. Decreasing own-car speed may require, for example, reducing a throttle setting, canceling cruise control operation, and/or application of own-car brakes. Own-car speed may be allowed to resume if the condition ahead becomes acceptable before cruise control operation is canceled.

ACC can use a sensor technology that transmits a beam, such as an ultrasonic acoustic, infrared optical, or radio frequency electromagnetic signal, in the forward direction with high precision. ACC can also use a directional receiver to detect such a signal. Whether a particular ACC design uses a directional transmitter, a directional receiver, or both, alignment precision can be important to avoiding interpreting traffic in adjacent lanes as being in the own-car lane. Either routine maintenance or repair may require readjustment or verification that the ACC sensor is properly aligned with the own-car longitudinal axis.

Presently-existing test apparatus, such as optical frame alignment tools, are in common use, and can verify that the four corners of a vehicle have been properly realigned after body repairs, as well as to check wheel alignment with respect to the vehicle structure. It is possible to use an optical frame alignment tool to determine the fore-and-aft axis of a vehicle starting at some point on the front of the vehicle, but this is not the complete measurement required for ACC alignment, and converting such an axis determination to the required alignment test is cumbersome to perform and affords marginal accuracy.

Accordingly, it would be desirable to provide a method and apparatus that aids in mechanically aligning and verifying the alignment of adaptive cruise control sensors.

SUMMARY OF THE INVENTION

The adaptive cruise control sensor alignment tool described herein includes a fitting that attaches with precision and repeatability to an adaptive cruise control sensor subassembly. Mounted to this fitting is a low energy visible light laser that can be adjusted to point along the signal axis of the ACC sensor subassembly. The point at which the visible light laser beam strikes a reference surface indicates the alignment of the ACC sensor subassembly with respect to the vehicle.

In another aspect, an adaptive cruise control sensor subsystem alignment tool comprises an illumination source, an illumination axis defined by the illumination source a plurality of gauge pins, each having a respective distal end, the distal ends arranged to define a plane, wherein the plane has a known orientation to the illumination axis, and a body to which the illumination source and the plurality of gauge pins are attached.

In yet another aspect, an adaptive cruise control sensor subsystem alignment tool comprises means for illuminating a target, means for establishing an illumination axis defined by the illumination means, means for making simultaneous physical contact with a plurality of reference surfaces on the adaptive cruise control sensor subsystem, means for establishing a specified angular relationship between a plane defined by the means for making contact and the illumination axis defined by the illuminating means, wherein the angular relationship occurs at the center of emission of the adaptive cruise control sensor subsystem being aligned, and means for combining the means for illuminating and the means for making contact in a unitary assembly.

In still another aspect, a method for aligning an adaptive cruise control sensor subsystem on a vehicle comprises the steps of providing an alignment tool, defining a target at which an axis of radiation of the adaptive cruise control sensor subsystem should point, establishing an illumination axis defined by a light beam on the alignment tool, contacting a plurality of reference surfaces on the adaptive cruise control sensor subsystem at specified orientations with respect to the axis of radiation of the adaptive cruise control sensor subsystem, establishing a specified angle between a plane defined by the plurality of reference surfaces on the adaptive cruise control sensor subsystem and a line defined by the axis of radiation of the adaptive cruise control sensor subsystem, and adjusting the orientation of the plurality of coplanar reference surfaces on the adaptive cruise control sensor subsystem until the illumination axis of the light beam on the alignment tool coincides with the target.

There have thus been outlined, rather broadly, some of the features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

DETAILED DESCRIPTION

An adaptive cruise control (ACC) sensor alignment tool as described herein comprises a body with reference surfaces that contact corresponding surfaces on an ACC sensor, and an illumination source that can be calibrated to point along the beam of the ACC sensor to permit alignment of the ACC sensor. The invention will now be described with reference to the drawing figures, in which like reference numerals refer to like parts throughout.

Figure 1:
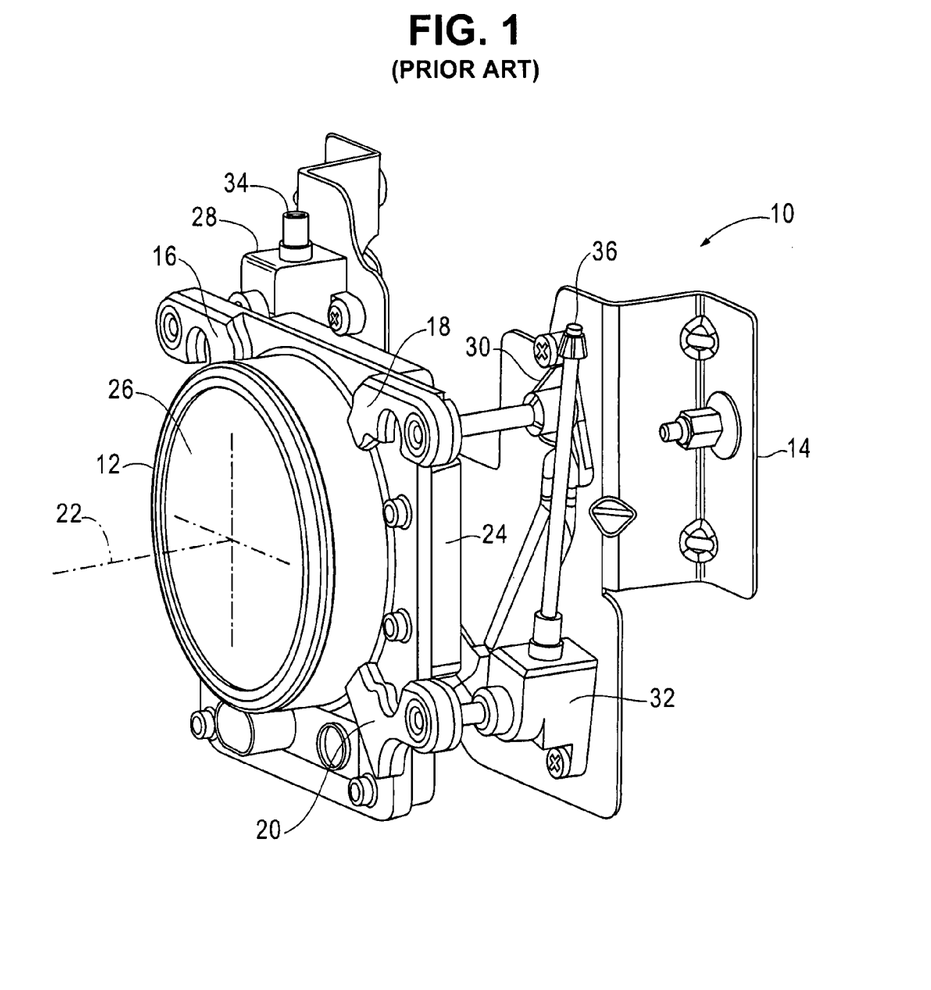
FIG. 1 is a perspective view of a typical ACC detection device including the adjustable vehicle interface.

FIG. 1 shows a representative ACC assembly 10 for a vehicle, a part of which is an ACC sensor subassembly 12 that can detect the range and/or rate of approach of an external object, such as another vehicle, and generate an electronic signal corresponding to that range and/or rate. Within the ACC assembly 10, the ACC sensor subassembly 12 can be weatherproof and substantially sealed, and can be mounted to a bracket 14 that can be installed at the front of the vehicle. The representative ACC sensor subassembly 12 and other embodiments referenced herein can be fitted with reference surfaces 16, 18, and 20 that can exist in fixed relation to the radiation axis 22 of the sensor 12. Thus, for example, in manufacturing the ACC sensor subassembly 12, an ACC manufacturer can assemble a unitized sensor frame 24 that includes preferably flat and coplanar reference surfaces 16, 18, and 20, along with a transmitter, a receiver, or a transceiver fixed within the sensor frame 24 and is further covered or embedded inside a weatherproof shell or a coating of permanent sealing material 26. The shell or sealing material 26 may be substantially transparent to the form of energy emitted and/or detected by the transmitter, receiver, or transceiver. During the building and sealing of the ACC sensor subassembly 12, it is desirable that the plane defined by the reference surfaces 16, 18, and 20 be aligned at a known orientation with respect to the radiation axis 22 of the transmitter, receiver, or transceiver.

The ACC sensor subassembly 12 can be joined to the bracket 14 by adjustable fittings 28, 30, and 32. This allows alignment of the ACC sensor subassembly 12 to the vehicle to be accomplished by mechanical actuation of ACC adjustment screws 34 and 36. It may be observed that the layout of the adjustable fittings 28, 30, and 32 shown in FIG. 1 allows the vertical and horizontal adjustments to be largely independent of each other. This can simplify alignment of ACC sensor subassembly 12.

Figure 2:
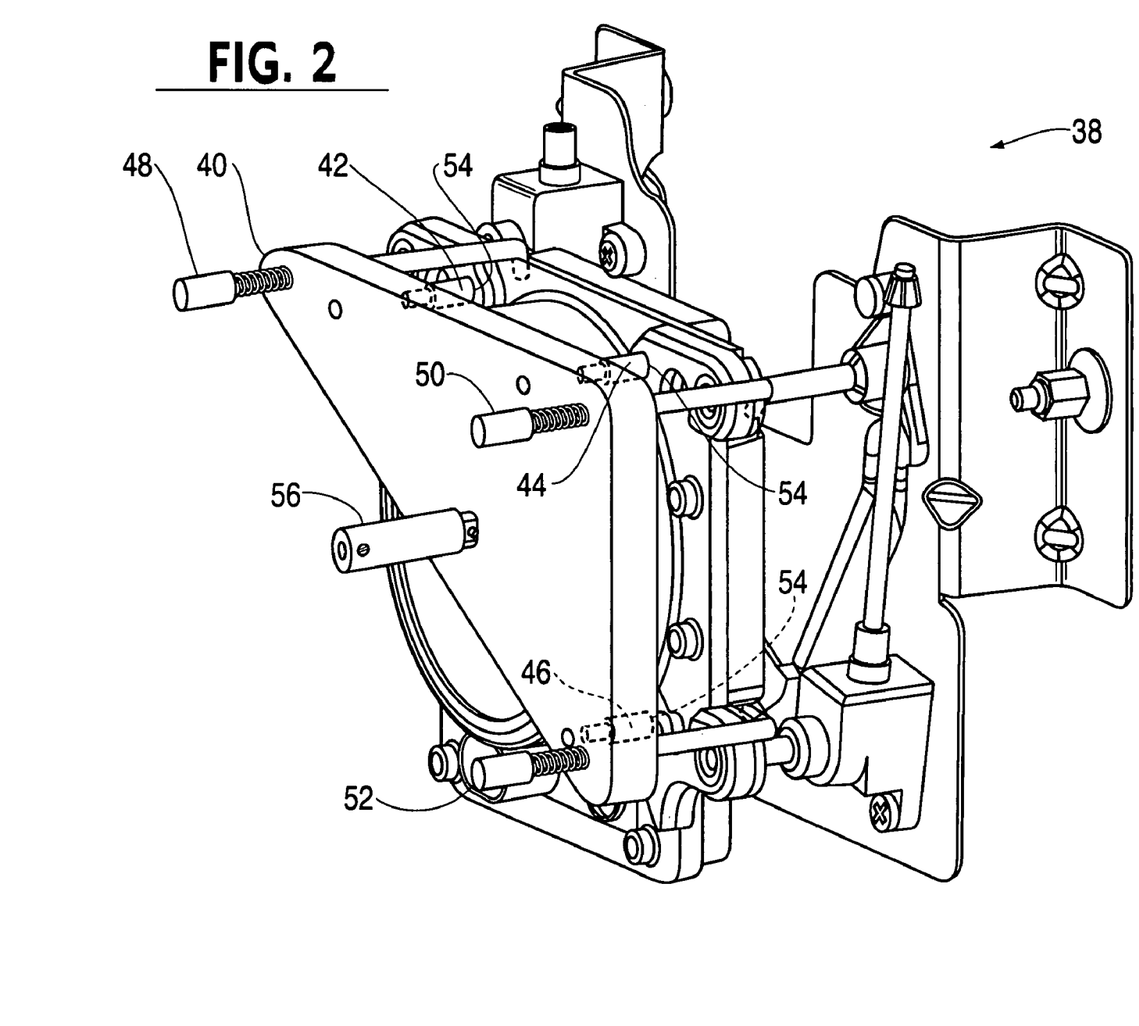
FIG. 2 is a perspective view showing an exemplary alignment tool in place over the ACC detection device of FIG. 1.

FIG. 2 shows the above-described assembly 10 with an exemplary alignment tool 38 attached thereto. It may be seen that the alignment tool 38 has attached to its body 40 three gauge pins 42, 44, and 46 that rest against the reference surfaces 16, 18, and 20, respectively, on the ACC sensor subassembly 12. Since the body 40 of the alignment tool 38 is oriented substantially vertically in use, it is desirable to use spring tension to hold the gauge pins 42, 44, and 46 in intimate contact with their respective reference surfaces 16, 18, and 20. This is realized in the exemplary alignment tool 38 by using three spring-loaded retention hooks 48, 50, and 52 to carry the weight of the alignment tool 38 and to introduce sufficient friction to prevent the gauge pins 42, 44, and 46 from shifting position after being attached to the ACC sensor 12 until the alignment tool 38 is removed. Like the reference surfaces 16, 18, and 20 shown in FIG. 1, the tips 54 of the gauge pins 42, 44, and 46 define a plane at a known orientation with respect to the radiation axis 22 of the ACC sensor subassembly 12.

The gauge pins 42, 44, and 46 shown in FIG. 2 may be of any suitable material or combination of materials, and are preferably made from hard, generally nonreactive materials such as ceramics and tool steels. Other materials, such as spring bronze, beryllium copper, some stainless steels, and other metal alloys, may be employed, particularly where the contact surface of the contact elements is no softer than and/or no less durable than the surface being contacted. Still other materials, including engineered plastics such as PEEK®, whether pure or mixed with finely divided solids such as talc or chopped fibers, can be employed, and may exhibit excellent wear properties along with low weight, good mechanical and thermal stability, and chemical non-reactivity. Coatings such as ceramics and finishes such as anodizing can be employed, and may also provide a hard and nonreactive finish over less durable but more manufacturable materials, and may allow, for example, the use of the same material for the body 40 and the gauge pins 42, 44, and 46. A similar benefit may be derived from the use of materials that can be annealed, machined, and then hardened.

Each gauge pin 42, 44, and 46 may be made from more than one piece, such as by co-molding a metallic threaded portion, a ceramic contact tip, and a plastic intermediate section into an integral component. Alternative gauge pin configurations may be preferable.

Affixed to the body 40 of the alignment tool 38 is shown an illumination source 56. This illumination source 56 can be, for example, a commercially available laser, which may comprise an envelope 72 in which are a laser diode with associated control and power circuitry, such as a power switch, a battery, a voltage regulator, and a voltage multiplier, as well as focusing and aiming apparatus and a provision for mounting the laser. Such a laser can provide a beam of light, such as visible light in the red portion of the visible spectrum, that is substantially collimated—that is, free of spreading. This light beam can project along an axis whose orientation with respect to gauge pins 42, 44, and 46 is at least substantially the same as the orientation of the radiation axis 22 of the ACC sensor subassembly 12 with respect to the reference surfaces 16, 18, and 20. Thus, after the alignment tool 38 is attached to the ACC sensor subsystem 12 by placing the gauge pins 42, 44, and 46 against the reference surfaces 16, 18, and 20 and positioning the spring-loaded retention hooks 48, 50, and 52 so as to hold the alignment tool 38 in place, the light beam from the illumination source 56 is at least substantially, and preferably to a high degree, parallel to and/or collinear with the radiation axis 22 of the ACC sensor subsystem 12.

Figure 3:
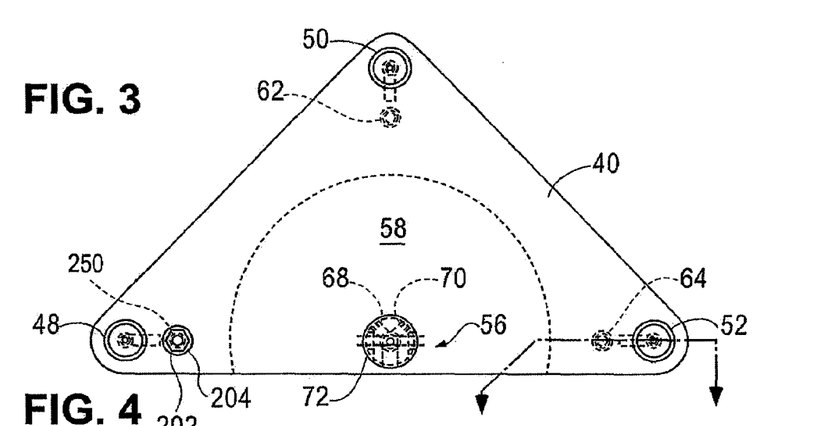
FIG. 3 is a top view of an alignment tool in accordance with the embodiment of the invention shown in FIG. 2.
Figure 4:
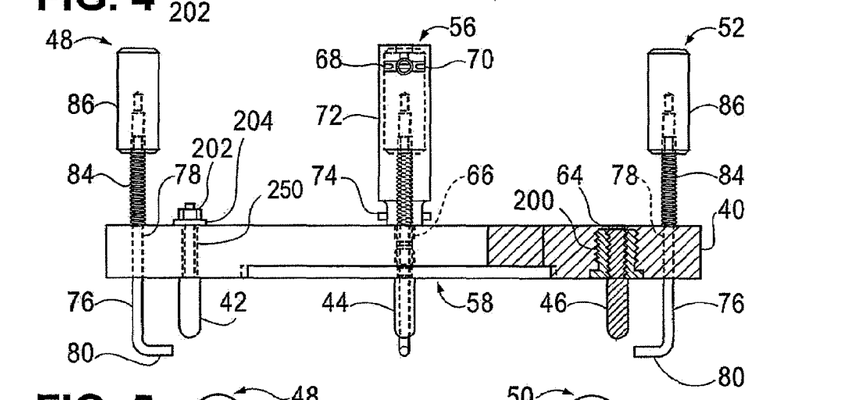
FIG. 4 is a front view of an alignment tool in accordance with the embodiment of the invention shown in FIG. 2.
Figure 5:
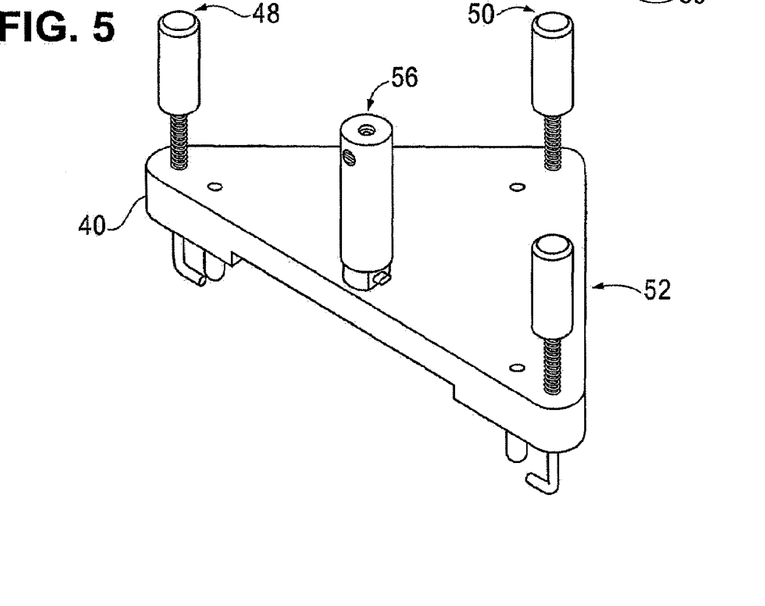
FIG. 5 is a perspective view of an alignment tool in accordance with the embodiment of the invention shown in FIG. 2.

FIGS. 3-5 show multiple views of the exemplary alignment tool 38. The triangular shape of the body 40 is preferred to substantially minimize the amount of material as well as the complexity of fabrication required to build the body 40, while preserving a desired degree of rigidity. As shown, the gauge pins 42, 44, and 46 are preferably placed in an orthogonal relationship near the corners of the body 40, with the spring-loaded retention hooks 48, 50, and 52 situated for the retention task shown in FIG. 2, and with the illumination source 56 preferably placed essentially at the center of a circular relief 58, shown in FIG. 4, in the body 40. The relief 58 accommodates the shell or sealing material 26 of the ACC sensor subsystem 12.

The illumination source 56 and the gauge pins 42, 44, and 46 are shown screwed into threaded holes 60, 62, 64, and 66 in the body 40. Material and workmanship tolerances are preferably selected to make this a suitably rigid and durable assembly with good initial alignment. Adjusting screws 68 and 70, capable of repositioning the illumination source 56 within its protective outer shell 72, are preferable to achieve fine alignment adjustment.

As an example of a fine alignment requirement for an ACC sensor alignment tool 38, a 40 mm circle may be marked on a vertical surface 7.5 meters from and at the same height as the illumination source 56. If the ACC sensor subsystem 12 is designed so that the plane of the reference surfaces 16, 18, and 20 is substantially perpendicular to the ACC sensor 12 emitting and/or detecting axis 22 and the direction of travel of the vehicle on which the ACC assembly 10 is mounted, and if the reference surfaces 16, 18, and 20 are equidistant from the ACC sensor 12 emitting and/or detecting axis 22, then final alignment of the illumination source 56 is at least substantially realized when the tips 54 of the gauge pins 42, 44, and 46 lie in a plane perpendicular to a line from the illumination source 56 to the center of the 40 mm circle and are equidistant from that line. Such an alignment may be made substantially permanent, for example, by using self-locking adjusting screws 68 and 70 or by application of a material such as an adhesive sealant to conventional adjusting screws 68 and 70.

Figure 13:
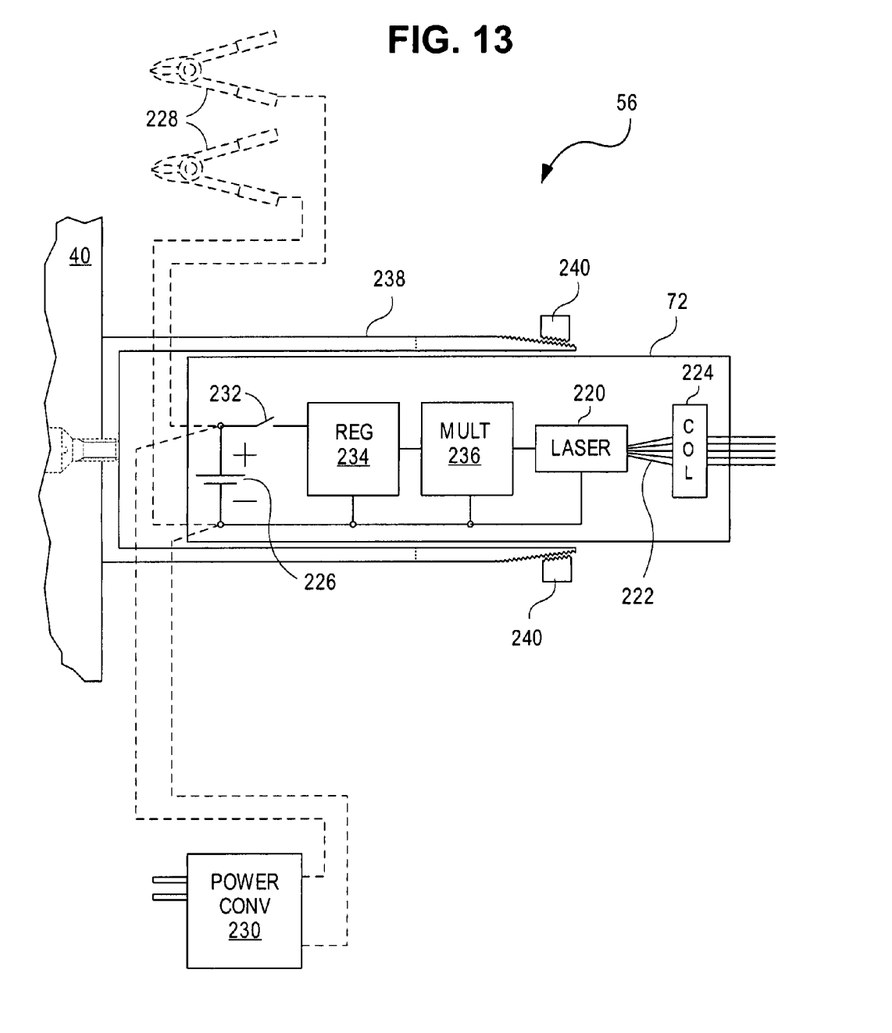
FIG. 13 is a block diagram of an illumination source compatible with a calibration tool according to an embodiment of the invention.

The illumination source 56 may include further features such as an ability to allow removal of the shell 72 without disturbing alignment, which removal may permit replacement of one or more batteries (shown in FIG. 13). The illumination source 56 may also support a power switch (shown in FIG. 13) with an actuator slide 74, preferably located as shown at the base of the illumination source 56 to permit the illumination source 56 to be switched on and off by moving the switch actuator slide 74 laterally.

Each of the exemplary spring-loaded retention hooks 48, 50, and 52 preferably has an extended center section 76, a portion of which can slide through a pass hole 78 in the body 40, an offset end 80 with a tip 82 that can make contact with an available location behind the reference surfaces 16, 18, and 20, a spring 84 that can provide the spring tension needed to apply force to the gauge pins 42, 44, and 46, and a handle 86 that can accept the force from the spring 84 pushing against the body 40 to withdraw the retention hook 48, 50, or 52. The retention hooks 48, 50, and 52 can be constructed from a variety of materials, such as stainless steel, for example. The retention hooks 48, 50; and 52 can be made of more than one piece, such as by attaching the handle 86 by screwing, gluing, pinning, or the like. The offset end 80 can be bent into shape, machined, or made from a separate piece and attached by screwing, riveting, welding, or other methods. The handle 86 can be, for example, knurled, ribbed, smooth, or otherwise textured, and can incorporate a cross hole for ease in gripping. Although represented in FIG. 3 as generally cylindrical, the handle 86 can be of any shape that allows it to be pressed and rotated and to provide a bearing surface for the spring 84. The spring 84 can be a helical spring surrounding a portion of the retention hook 48, 50, or 52 as shown in FIG. 3, or can have another form that permits rotation of the retention hook 48, 50, or 52 and applies tension when needed.

Figure 6:
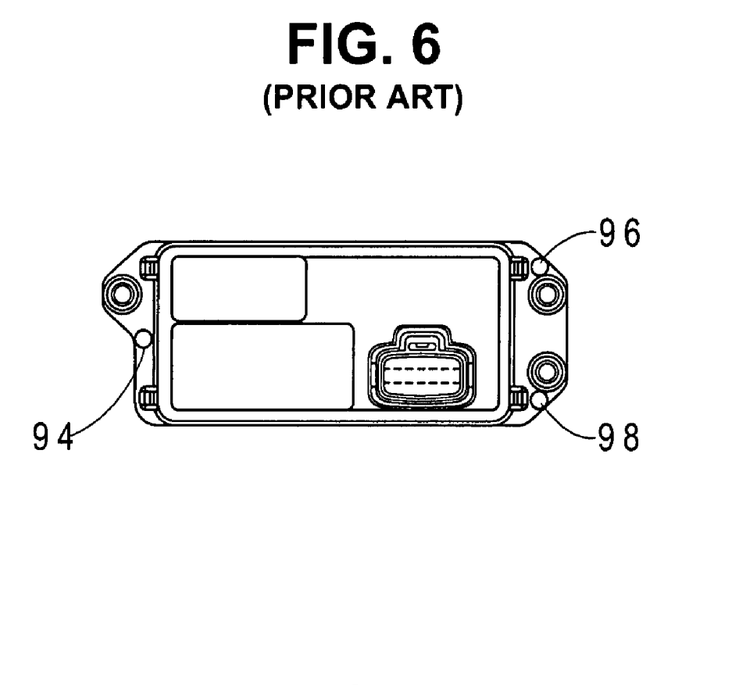
FIG. 6 is a front view of a second style of ACC detection device.
Figure 7:
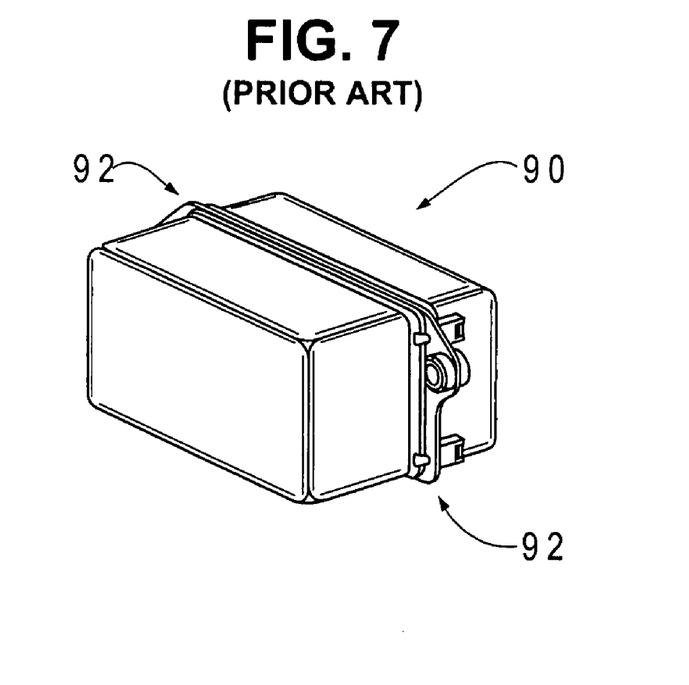
FIG. 7 is a perspective view of the second style of ACC detection device shown in FIG. 6.

FIGS. 6 and 7 show a second style of ACC sensor subassembly 90 that is not physically compatible with the above alignment tool 38. To permit alignment using the general approach described herein, it is preferable that the ACC sensor subassembly 90 or any other design of sensor to be aligned to a vehicle have an externally accessible reference plane 92 to which the transducer within the sensor subassembly 90 is permanently aligned. The reference surfaces 94-98 in FIG. 6 define such a reference plane.

Figure 8:
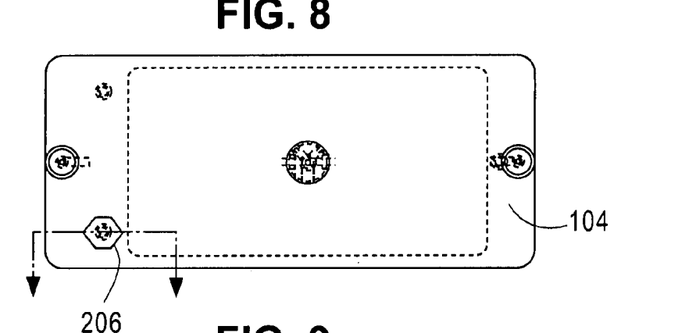
FIG. 8 is a top view of a second calibration tool that can be attached to the second style of ACC detection device shown in FIG. 6.
Figure 9:
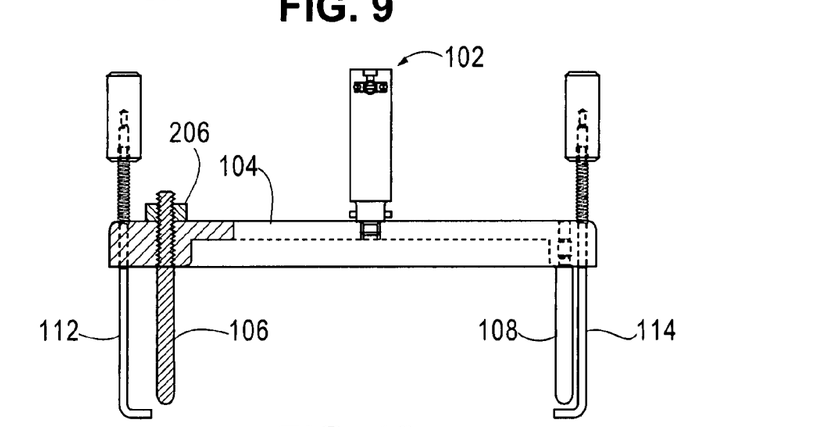
FIG. 9 is a front view of the second calibration tool shown in FIG. 8.
Figure 10:
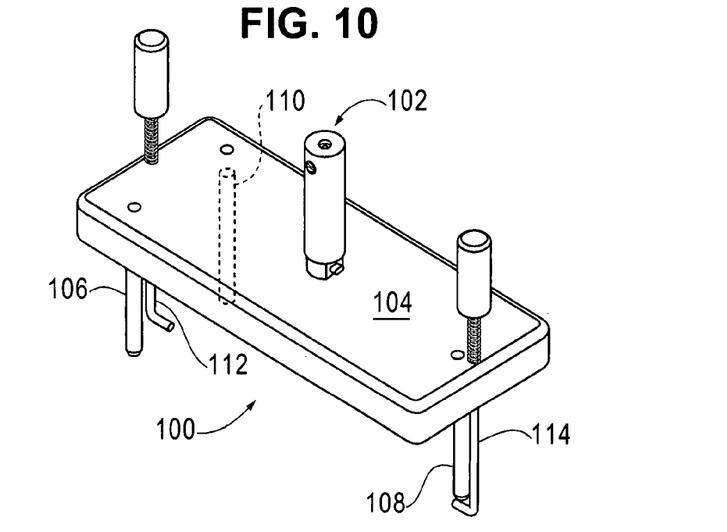
FIG. 10 is a perspective view of the second calibration tool shown in FIG. 8.

FIGS. 8, 9, and 10 show a second calibration tool 100, one that is compatible with the sensor subassembly 90 of FIG. 4. An illumination source 102 can be affixed in the second style of body 104, while three gauge pins 106, 108, and 110 can, as in the previous configuration, allow precise contact with the reference surfaces 94-98 of FIG. 4 that define the reference plane 92 of the sensor subassembly 90. In this second embodiment, two spring-loaded retention hooks 112 and 114 are shown, which provide the requisite attachment force.

Figure 11:
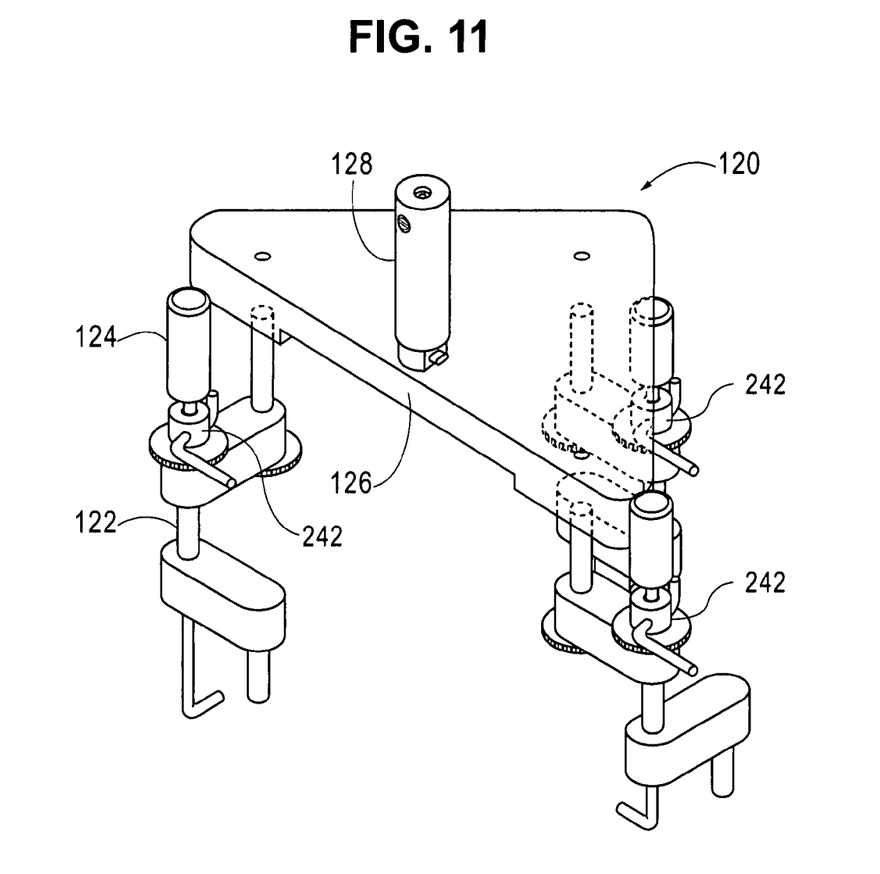
FIG. 11 is a perspective view of an articulated calibration tool.

Generic alignment tool designs are also possible, as shown in FIG. 11. For such a design 120, the gauge pins 122 may need to be articulated while retaining the precision of rigid pins, while the spring-loaded retention hooks 124, likewise, may require long reach, as shown in FIG. 6, or articulation similar to that of the gauge pins 122 themselves. These articulations may permit the illumination source 128 to be fixed with respect to the alignment tool body 126, and may require the technician to make a reasonable effort to position the illumination source 128 above the radiation center of the ACC sensor subassembly being aligned. In a variation on this concept, the articulated alignment tool 120 can be used in conjunction with a setup station that can have setup processes for each type of ACC sensor subassembly to be aligned, allowing the gauge pins 122, for example, to be locked for a particular sensor rather than movable.

Figure 12:
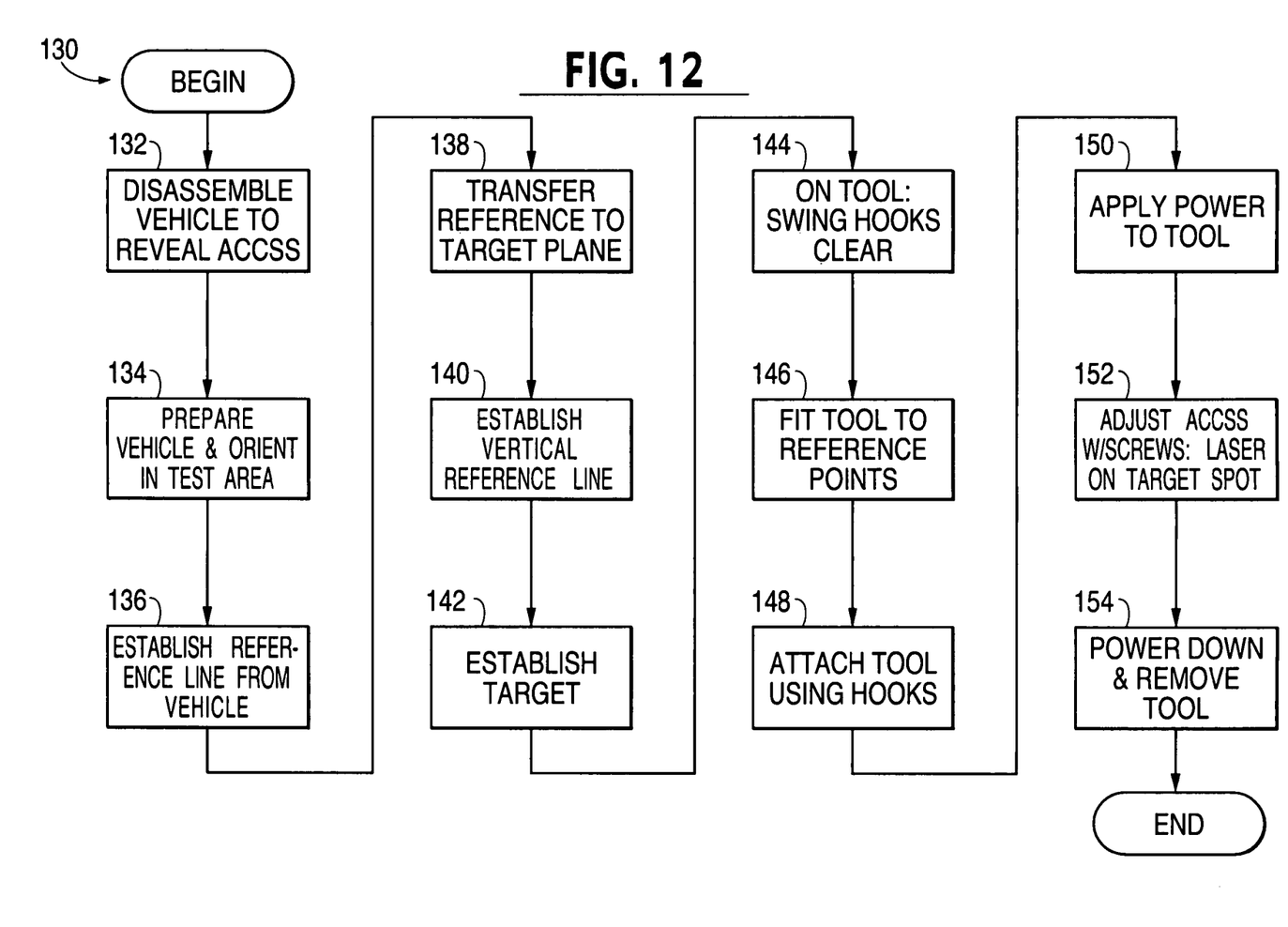
FIG. 12 is a process flow chart indicating steps in a method for using an embodiment of the invention.

The method of application for many alignment tool designs may be similar, however. In many cases, as shown in FIG. 12 in a procedural flow chart 130, in which reference is made to reference numerals found in FIGS. 1-3, the device to be calibrated, such as an ACC sensor subassembly 12, is to be aligned with the longitudinal axis of a vehicle. The adaptive cruise control assembly 10 can first be exposed sufficiently 132 to permit an alignment tool 38 to be affixed.

Either before or after the above sequence, the vehicle under test can be set up 134, which can comprise such steps as checking for proper tire pressure, loading the vehicle with the equivalent of driver and/or passenger weights, and positioning the vehicle on a level surface 7.5 meters from a vertical wall or equivalent reference plane. A reference line for the vehicle can be established using wheel centers, suspension reference points, body or frame points, or the like, indicating a precise direction of normal motion with respect to a specific point on the vehicle 136. The intersection of the longitudinal axis so established and the reference plane may be used to define a starting reference point (at the front of the vehicle) and a finishing reference point (at the reference plane) 138. Next, the lateral distance from the starting reference point to the center of the ACC sensor subassembly 12 can be transferred to the finishing reference point to establish a vertical target line 140, and the height of the center of the ACC sensor subassembly 12 can be transferred to the vertical target line to establish the target point and can permit affixing a 40 mm-diameter target thereto, centered on the target point 142.

Next, in a preferred embodiment, the alignment tool 38 can have its spring-loaded retention hooks 48, 50, and 52 swung out of the way 144, after which the alignment tool 38 can be positioned so that its gauge pins 42, 44, and 46 contact the reference surfaces 16, 18, and 20 of the unit under test 146. Preferably, the retention hooks 48, 50, and 52 can be pushed against spring force and rotated until each hook tip is positioned behind its local reference point 16, 18, or 20 or behind a convenient point on the reference surface as in FIG. 6. Each retention hook is then released to establish retention force 148. Next, the illumination source 56 can be powered on 150. The ACC sensor subassembly 12 can then be adjusted using ACC adjustment screws 34 and 36 until the illumination spot falls within the 40 mm circle 152. The illumination source 56 may then be powered off, the alignment tool 38 removed, and the vehicle reassembled as necessary 154.

Alternative illumination source 56 designs may be identified that could be suitable for this application. Since the illumination source 56 can be expected to have a low duty cycle in many applications, there may a benefit in using a replaceable, disposable battery with long shelf life. An illumination source 56 powered from a rechargeable battery, the battery of the vehicle under test, or an electrical outlet, however, may be preferable where frequent or prolonged use is contemplated.

A non-laser light source may be practical. Lasers are known for intrinsic low spreading and high power efficiency. Non-laser light sources such as light emitting diodes or halogen-filled filament bulbs, two of many examples of alternate light sources, may be able to fulfill the tight beam requirement through focusing, collimation, or other techniques. In applications where power limitations are less stringent, still other alternative light sources may be practical. Testing outdoors in full daylight or at low light levels inside a service center may dictate a specific light source performance level or capability for a source to emit at a multiplicity of brightness levels.

Alternate attachment methods between the illumination source 56 and the body 40 are feasible. These might include, for example, a single female screw fitting at the base that would require a separate male screw to be applied from the opposite side of the body 40. Another attachment method might be a friction fit sleeve separately mounted to the body 40 with or without a tapered nut to permit the illumination source 56 to be positively clamped. Another attachment method might use one or more threaded holes along a flat surface of the illumination source 56, with an integral or added mating surface projecting out of the body 40 through which mounting screws could be driven into the threaded holes. These and other alternative mounting methods share the property of providing secure mounting that can be expected to remain fixed with respect to the body 40 after assembly.

Adjustment of the alignment of the illumination source 56 may be realized in a variety of ways, of which the exemplary embodiment, which uses a pivoting bottom point (internal to the illumination source 56) and a pair of orthogonal adjusting screws 68 and 70, is one that has been shown to be practical. Another adjustment method can use a non-adjustable illumination source 56 fixed to the body 40, and can use, for example, threads with jam nuts 206, as shown in FIG. 9, on at least two of the three pins 42, 44, and 46 so that screwing the pins 42, 44, and 46 in and out and locking them in place, for example with the jam nuts 206, can adjust the direction of the beam of the illumination source 56 with respect to the plane defined by the tips 54 of the pins 42, 44, and 46.

The tips 54 of the gauge pins 42, 44, and 46 have been described herein as hemispherical in the exemplary embodiment. An alternative tip 54 design may be preferable, given that the reference surfaces 16, 18, and 20 and 94, 96, and 98 in the two ACC applications shown herein are all essentially flat and lie in common planes perpendicular to their respective ACC sensor axes. Other ACC sensor designs that provide reference surfaces and retention hook attachment locations different from those shown herein may require different interface styles without departing from the spirit of the invention.

Attachment of the gauge pins 42, 44, and 46 to the body 40 may use male screw threads integral to the gauge pins driven into female threaded holes in the body 40. The female threaded holes in the body 40 may be reinforced with inserts, which inserts may be screwed, pressed, pinned, co-molded, or otherwise permanently installed. The gauge pins 42, 44, and 46 themselves may similarly be screwed, pressed, co-molded, vibro-inserted, cryo-pressed, or installed by another suitable technology with or without inserts 200, or may be formed integrally with the body 40, as by molding or machining, where the alignment tool calibration process does not forbid such a method of attachment. The gauge pins 42, 44, and 46 may instead be attached to the body 40 using separate fastenings 202, 204 with unthreaded holes 250 in the body 40.

As indicated above, the shape and the construction of the exemplary tool body 40 have been shown to achieve a combination of sturdiness, rigidity, and low weight. Materials and methods of manufacture as well as shape and construction are subject to review in light of total lifetime cost considerations, however. Thus, machining each tool body 40 from an aluminum slab might be preferable for production of a small number of alignment tools, while a process such as casting or injection molding the body from metal or an engineering plastic with or without reinforcement such as talc or fibers, and using co-molded or integral gauge pins, for example, might be preferable for quantities that justify more complex tooling. Other combinations of materials and manufacturing processes may be preferred when other criteria are applied.

The spring-loaded retention hooks 48, 50, and 52, likewise, can have other implementations. The retention hooks 48, 50, and 52 shown in the exemplary embodiment provide spring tension and are comparatively simple, while being unlikely to get caught on obstructions and interfere thereby with installation or removal of the alignment tool 38. Alternative retention hook designs, such as the use of cam actuated clamping devices 242, as shown in FIG. 11, instead of or in addition to springs, may be preferable for these or other ACC sensor subassembly configurations. Hookless designs can be realized, using, for example, shop compressed air with a venturi-type vacuum generator to use one or more suction cups in place of retention hooks. A magnetic base, for another example, attached to the vehicle by an articulated arm, can likewise provide retention force. The retention hooks 48, 50, and 52 can each be made of a single piece and captured by a separate clamp forming part of the pass hole 78.

FIG. 13 is a block diagram of a portion of an alignment tool, including an illumination source 56 compliant with the invention. An outer shell 72 encloses a light source 220, such as a laser, a light emitting diode, or a quartz-halogen incandescent lamp. The emitted light 222 from the light source 220 may be focused or collimated by a collimator 224, which may be a lens. The light source 220 generally requires a source of electrical power, such as, for example, an internal battery 226, cabled clips 228 for attachment to an external battery such as that of the vehicle (not shown), and an external power supply 230 that may convert mains power (not shown) to a level suitable to serve as an input for the light source 220. In view of the requirements of batteries and of light sources such as lasers, the illumination source 56 may further include a power switch 232, a voltage regulator 234, and a voltage multiplier 236. The block diagram further shows an attachment embodiment in the form of a friction fit sleeve 238, separately mounted to the body 40, along with a tapered nut 240, to permit the illumination source 56 to be positively clamped to the body 40.

The alignment tools and the methods of making, aligning, and using the tools that are disclosed herein are suitable for aligning adaptive cruise control sensor assemblies in a variety of hardware configurations. The tools and methods may also be suitable for other purposes, such as other alignment activities and activities other than alignment. Tools made and aligned according to the described methods can provide an arbitrarily accurate reference axis. A similar tool with a beam splitter or with multiple laser sources at various positions and orientations can provide multiple axes at any desired orientation with respect to a reference plane, which may be of use, for example, in setting up work in milling machines, assembling large machine parts, and other high-precision tasks.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. An alignment tool for an adaptive cruise control sensor subsystem, comprising:
   an illumination source;
   an illumination axis defined by said illumination source;
   a plurality of gauge pins;
   a plurality of distal ends of said gauge pins;
   a plane defined by said distal ends, wherein said plane is orthogonal to said illumination axis;
   a body to which said illumination source, and said plurality of gauge pins are attached; and
   a plurality of retention hooks, wherein each of said retention hooks further comprises:
   an oblong center section;
   an offset end that can move parallel to a long axis of said oblong center section;
   a gripping tip; and
   a handle.

2. The alignment tool of claim 1, wherein said illumination source further comprises a laser.

3. The alignment tool of claim 2, wherein said laser further comprises direction adjustment fittings.

4. The alignment tool of claim 1, wherein said illumination source further comprises self-contained battery operation.

5. The alignment tool of claim 1, wherein said illumination source further comprises power from at least one remote electrical source.

6. The alignment tool of claim 1, wherein said illumination source further comprises attachment to said body by a male screw thread integral to said illumination source.

7. The alignment tool of claim 6, wherein said male screw thread further comprises a screw thread axis collinear with said illumination source axis.

8. The alignment tool of claim 1, wherein said illumination source further comprises attachment to said body by at least one female screw thread integral to said illumination source.

9. The alignment tool of claim 1, wherein said alignment tool further comprises a compressive sleeve attaching said illumination source to said body by surrounding said illumination source at least in part and applying clamping force to said illumination source.

10. The alignment tool of claim 1, wherein said gauge pins are further comprised of one of tool steel, stainless steel, ceramic, ceramic-coated metal, aluminum alloy, spring metal alloy, unfilled engineered plastic, and filled engineered plastic.

11. The alignment tool of claim 1, wherein said gauge pins are further comprised of a material of durability no less than that with which said gauge pins make contact when in use.

12. The alignment tool of claim 1, wherein said gauge pins screw into one of threaded holes in said body, threaded inserts in said body, and threaded nuts located beyond unthreaded apertures in said body.

13. The alignment tool of claim 1, wherein said gauge pins attach to said body by one of co-molding, vibroinsertion, differential temperature interference fitting, and press fitting.

14. The alignment tool of claim 1, wherein said gauge pins are formed integrally with said body.

15. The alignment tool of claim 1, wherein each of said retention hooks further comprises:
   a spring applying force to draw said offset end toward said body;
   a body bearing surface on said body against which said spring can bear; and
   a hook bearing surface on said hook against which said spring can bear.

16. The alignment tool of claim 1, wherein each of said retention hooks further comprises a locking cam to hold said retention hook in position.

17. The alignment tool of claim 1, wherein each of said retention hooks is able to rotate.

18. An alignment tool for an adaptive cruise control sensor subsystem, comprising:
   means for illuminating a target;
   means for establishing an illumination axis defined by said illumination means;

means for making simultaneous physical contact with a plurality of coplanar reference surfaces on an adaptive cruise control sensor subsystem;

means for establishing orthogonality between a plane defined by said means for making contact and the illumination axis defined by said illuminating means, wherein said orthogonality occurs at the center of emission of the adaptive cruise control sensor subsystem being aligned; and means for combining said means for illuminating and said means for making contact in a unitary assembly.

19. The alignment tool of claim 18, further comprising means for affixing said alignment tool to said sensor subsystem, wherein said means for affixing affords hands-free usage of said alignment tool.

20. The alignment tool of claim 18, further comprising means for affixing said alignment tool to said sensor subsystem, wherein said means for affixing uses spring-loaded clamping fittings.

21. The alignment tool of claim 18, further comprising means for adjusting said means for illuminating, wherein said means for adjusting uses integral adjusting screw fittings.

22. The alignment tool of claim 18, further comprising means for adjusting said means for illuminating, wherein said means for adjusting provides said adjusting through changes in the positions of said means for making contact.

23. A method for aligning an adaptive cruise control sensor subsystem on a vehicle, comprising the steps of:

defining a target at which an axis of radiation of the adaptive cruise control sensor subsystem should point;

establishing an illumination axis defined by a light beam on an alignment tool;

contacting a plurality of coplanar reference surfaces on the adaptive cruise control sensor subsystem, perpendicular to the axis of radiation of the adaptive cruise control sensor subsystem;

establishing orthogonality between a plane defined by contacting the plurality of coplanar reference surfaces on the adaptive cruise control sensor subsystem and a line defined by establishing an illumination axis; and adjusting the orientation of the plurality of coplanar reference surfaces on the adaptive cruise control sensor subsystem until the target coincides with the illuminated spot.

24. The method for aligning adaptive cruise control sensor subsystem of claim 23, further comprising affixing the alignment tool to the sensor subsystem, wherein the affixing affords hands-free usage of the alignment tool.

25. The method of claim 23, further comprising affixing the alignment tool to the sensor subsystem, wherein the affixing uses spring-loaded clamping fittings.

26. The method of claim 23, further comprising adjusting the alignment of the axis of the adaptive cruise control sensor subsystem subject to guidance afforded by the alignment tool, wherein the adjusting uses integral adjusting screw fittings.

* * * * *